US008498217B2

(12) United States Patent
Kota et al.

(10) Patent No.: US 8,498,217 B2
(45) Date of Patent: Jul. 30, 2013

(54) METHOD AND SYSTEM FOR ADAPTIVE TONE CANCELLATION FOR MITIGATING THE EFFECTS OF ELECTROMAGNETIC INTERFERENCE

(75) Inventors: Kishore Kota, Aliso Viejo, CA (US); Kadir Dinc, Irvine, CA (US); Ahmad Darabiha, Irvine, CA (US); Mehdi Tavassoli Kilani, Aliso Viejo, CA (US); Scott Powell, Aliso Viejo, CA (US); Tooraj Esmailian, Mission Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 288 days.

(21) Appl. No.: 12/835,419

(22) Filed: Jul. 13, 2010

(65) Prior Publication Data

US 2012/0002711 A1 Jan. 5, 2012

Related U.S. Application Data

(60) Provisional application No. 61/360,800, filed on Jul. 1, 2010.

(51) Int. Cl.
 *G01R 31/08* (2006.01)
(52) U.S. Cl.
 USPC .......................................... 370/252; 370/419
(58) Field of Classification Search
 None
 See application file for complete search history.

(56) References Cited

U.S. PATENT DOCUMENTS

| 5,659,583 | A | * | 8/1997 | Lane | 375/346 |
|---|---|---|---|---|---|
| 7,852,950 | B2 | * | 12/2010 | Sedarat | 375/260 |
| 2002/0159467 | A1 | * | 10/2002 | Kirshenboim et al. | 370/410 |
| 2003/0026333 | A1 | * | 2/2003 | Murray et al. | 375/229 |
| 2004/0234002 | A1 | * | 11/2004 | Yang et al. | 375/263 |
| 2005/0053229 | A1 | * | 3/2005 | Tsatsanis et al. | 379/406.01 |
| 2006/0088088 | A1 | * | 4/2006 | Liu et al. | 375/232 |
| 2006/0256849 | A1 | * | 11/2006 | Tseng et al. | 375/232 |
| 2007/0230555 | A1 | * | 10/2007 | Peleg et al. | 375/232 |
| 2007/0263857 | A1 | * | 11/2007 | Sharon et al. | 379/416 |
| 2008/0104158 | A1 | * | 5/2008 | Farhoodfar et al. | 708/405 |
| 2011/0235759 | A1 | * | 9/2011 | Pierrugues et al. | 375/346 |

* cited by examiner

*Primary Examiner* — Marsha D Banks Harold
*Assistant Examiner* — Hooman Houshmand
(74) *Attorney, Agent, or Firm* — Thomas | Horstemeyer, LLP

(57) ABSTRACT

Aspects of a method and system for adaptive tone cancellation for mitigating the effects of interference are provided. In this regard, an Ethernet PHY may receive one or more signals via a corresponding one or more physical channels and generate one or more estimate signals, each of which approximates interference present in a corresponding one of the received signals. The Ethernet PHY may subtract each one of the estimate signals from a corresponding one of the received signals. The subtracting may occur at the input of one or more slicers in the Ethernet PHY. The received signals may be processed via one or more equalizers in the Ethernet PHY. A decision output of a slicer in the Ethernet PHY may be subtracted from one of the said one or more received signals, and a signal resulting from the subtraction may be utilized to generate the one or more estimate signals.

20 Claims, 7 Drawing Sheets

METHOD AND SYSTEM FOR ADAPTIVE TONE CANCELLATION FOR MITIGATING THE EFFECTS OF ELECTROMAGNETIC INTERFERENCE

CROSS-REFERENCE TO RELATED APPLICATIONS/INCORPORATION BY REFERENCE

This patent application makes reference to, claims priority to and claims benefit from U.S. Provisional Patent Application Ser. No. 61/360,800 filed on Jul. 1, 2010.

The above stated application is hereby incorporated herein by reference in its entirety.

FIELD OF THE INVENTION

Certain embodiments of the invention relate to signal processing. More specifically, certain embodiments of the invention relate to a method and system for adaptive tone cancellation for mitigating the effects of electromagnetic interference.

BACKGROUND OF THE INVENTION

In almost any communication system, interference, externally and/or internally generated, limits the performance of the communication system. Differential signaling is one technique that can be utilized for dealing with such interference. However, while differential signaling may reduce the effects of such interference, it does not eliminate them.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for adaptive tone cancellation for mitigating the effects of electromagnetic interference, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for adaptive tone cancellation for mitigating the effects of electromagnetic interference. In various embodiments of the invention, an Ethernet PHY may receive one or more signals via a corresponding one or more physical channels and generate one or more estimate signals, each of which approximates interference present in a corresponding one of the received signals. The Ethernet PHY may subtract each one of the estimate signals from a corresponding one of the received signals. The subtracting may occur at the input of one or more slicers in the Ethernet PHY. The received signals may be processed via one or more equalizers in the Ethernet PHY. One of the received signals at an output of one of the equalizers may be utilized to generate the one or more estimate signals. The Ethernet PHY may receive a common mode signal from a common mode sensor coupled to one of the physical channels. The common mode signal may be utilized to generate the one or more estimate signals. A decision output of a slicer in the Ethernet PHY may be subtracted from an output of an equalizer in the Ethernet PHY, and a signal resulting from the subtraction may be utilized to generate the one or more estimate signals.

The one or more estimate signals may be generated utilizing a selected one of the following signals: a signal output by an equalizer in the Ethernet PHY, a signal resulting from a subtraction of a slicer decision output from the equalizer output, and a signal output by a common mode sensor coupled to one of the physical channels. The selection may be based on a strength of the interference. The Ethernet PHY may be operable to generate a pair of phase-quadrature signals having a frequency that tracks a frequency of the interference. An adaptive filter in the Ethernet PHY may utilize the phase-quadrature signals to generate the one or more estimate signals. The one or more estimate signals may be generated utilizing a selected one of a decision output of a slicer and an error output of the slicer. The selected one of the decision output and the error output may be utilized by the adaptive filter for generating the one or more estimate signals. The selection may be based on a strength of the interference.

Figure 1:
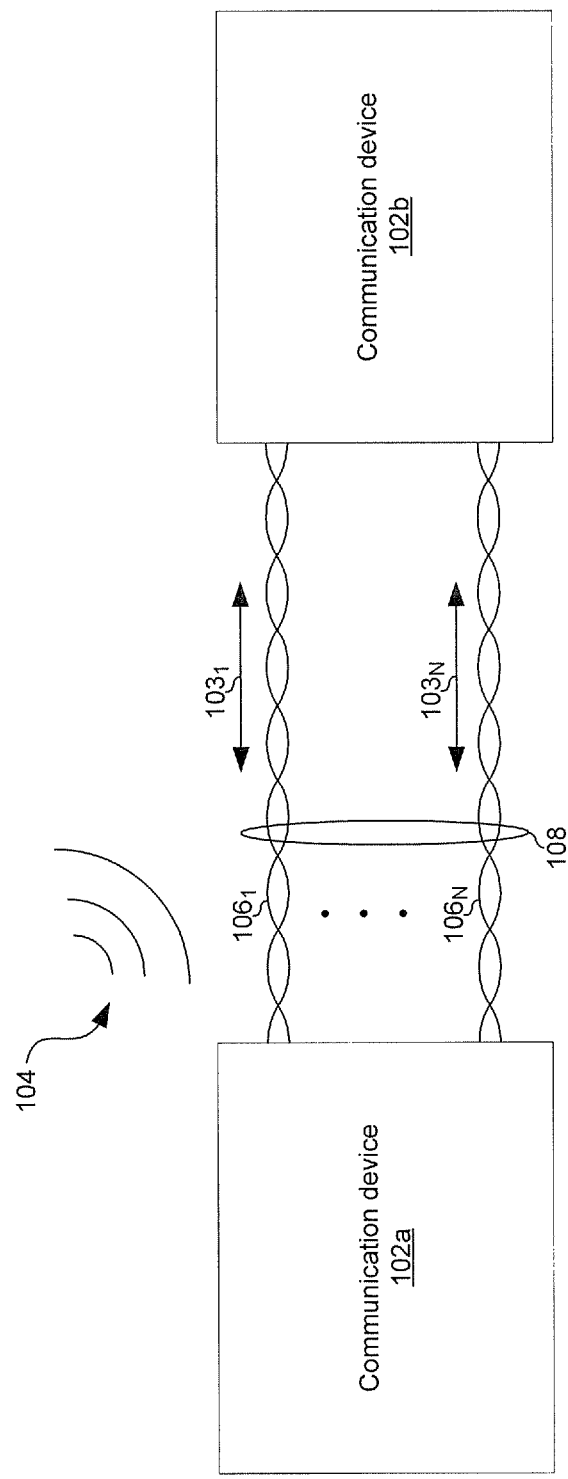
FIG. 1. is a diagram depicting two communication devices communicating over a plurality of physical channels, in accordance with an embodiment of the invention.

FIG. 1 is a diagram depicting two communication devices communicating over a plurality of physical channels, in accordance with an embodiment of the invention. Referring to FIG. 1 there is shown a communication device 102$a$ and a communication device 102$b$ which communicate over a cable 108 that comprises physical channels $106_1$-$106_N$, where N is an integer greater than or equal to 1.

Each of the communication devices 102$a$ and 102$b$ may comprise suitable logic, circuitry, interfaces, and/or code that may be operable to communicate, utilizing differential signaling, over one or more of the channels $106_1$-$106_N$. Each channel $106_n$ may comprise, for example a twisted-pair, where n is an integer between 1 and N inclusive. In this regard, each of the communication devices 102$a$ and 102$b$ may comprise one or both of a transmitter and a receiver. In various embodiments of the invention, the communication devices 102$a$ and 102$b$ may communicate over the cable 108 in accordance with IEEE 802.3 (Ethernet) standards. For example, for 10/100/1G/10GGBASE-T the cable 108 may comprise twisted pairs $106_1$-$106_4$, and the communication devices 102a and 102b may, depending on the particular 802.3 standard being utilized, may engage in simplex, half-duplex, and/or full-duplex communications over one or more of the twisted pairs $106_1$-$106_4$.

In operation, signals $103_1$-$103_N$ may be present on the channels $106_1$-$106_N$. Electromagnetic interference signal 104 may be incident on the cable 108 and may appear on the channels $106_1$-$106_N$ as interference components $104'_1$-$104'_N$. Thus, the signals $103_1$-$103_N$ may comprise desired components $105_1$-$105_N$, (not shown) respectively, and interference components $104'_1$-$104'_N$ (not shown), respectively. Exemplary sources of the interference 104 comprise broadcast radio and/or television signals, cellular signals, walkie-talkie signals, and interference radiated from other electronic devices or cables located near the cable 108. Degraded communications over the cable 108 resulting from the interference 104 may manifest itself in the form of, for example, increased receive error rates in the communication devices 102a and 102b. Accordingly, for each channel $106_n$, where n is an integer between 1 and N, inclusive, a signal that estimates the interference component $104'_n$ may be generated, and estimated interference signal may be subtracted from the signal $103_n$ received via the channel $106_n$.

In an exemplary embodiment of the invention, the interference components $104'_1$-$104'_N$ may be estimated by detecting the common mode signal on one of the channels $106_1$-$106_N$ utilizing a common mode sense circuit. In an exemplary embodiment of the invention, the interference components $104'_1$-$104'_N$ may be estimated utilizing the output of one of a plurality of equalizers that process signals received via channels $106_1$-$106_N$, thus eliminating the need for the common mode sense circuit. In an exemplary embodiment of the invention, either the equalizer output or the common mode sense circuit output may be selected based on the strength of one or more of the interference components $104'_1$-$104'_N$. The strength of the interference components may be determined by, for example, monitoring an error rate in the receiver.

Figure 2A:
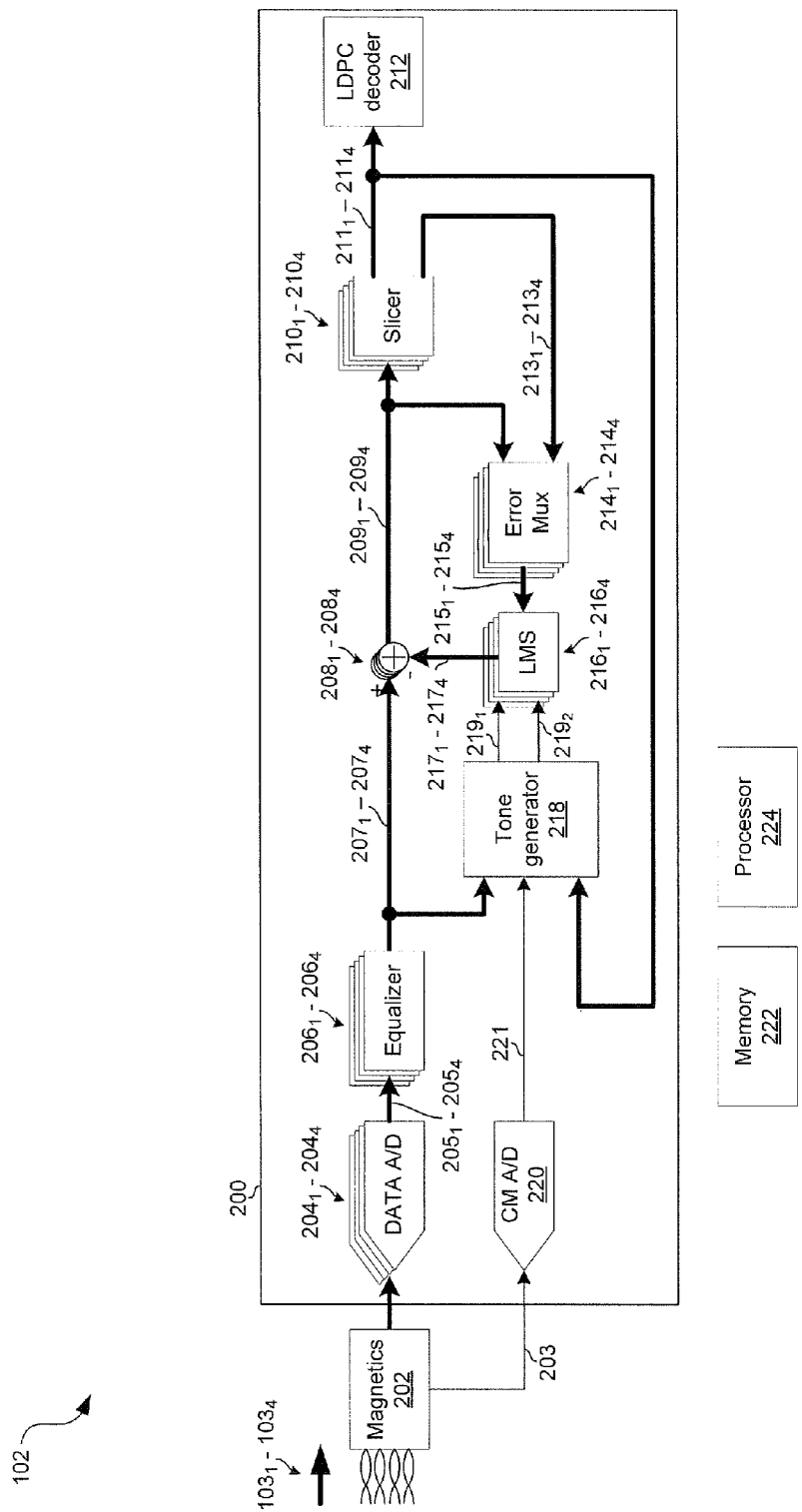
FIG. 2A is a diagram depicting an exemplary portion of a communication device that may be operable to provide interference cancellation, in accordance with an embodiment of the invention.

FIG. 2A is a diagram depicting an exemplary portion of a communication device that may be operable to provide interference cancellation, in accordance with an embodiment of the invention. Referring to FIG. 2A there is shown a portion of a communication device 102 which may communicate over four physical channels, that is, N=4. The communication device comprises magnetics 202, memory 222, processor 224, and an Ethernet PHY 200. Depicted portions of the Ethernet PHY 200 comprise analog-to-digital converters (ADCs) $204_1$-$204_4$, equalizers $206_1$-$206_4$, combiners $208_1$-$208_4$, slicers $210_1$-$210_4$, low density parity check (LDPC) decoder 212, error multiplexer $214_1$-$214_4$, adaptive filter $216_1$-$216_4$, tone generator 218, and ADC 220. In the exemplary embodiment of the invention depicted in FIGS. 2A-2D, N is equal to 4, but the invention is not so limited.

In various embodiments of the invention, the various components depicted in FIG. 2A may be interconnected via differential traces on and/or in printed circuit boards (PCBs) and/or integrated circuits (ICs) on and/or in which the components are fabricated. Such differential signal routing may reduce noise coupled into the signals within and/or on the PCBs and/or ICs.

The magnetics 202 may comprise suitable logic, circuitry, interfaces, and/or code that may be operable to couple the channels $106_1$-$106_4$ to the Ethernet PHY 200. In this regard, the magnetics 202 may provide noise and/or EMI suppression and/or may impedance match the channels $106_1$-$106_4$ to the Ethernet PHY 200. In this regard, the magnetics 202 may comprise one or more transformers and/or one or more inductive chokes. In some instances, the magnetics 202 may also comprise other components such as resistors, capacitors, and/or inductors for achieving impedance matching, isolation, and/or noise and/or EMI suppression. In some embodiments of the invention, the magnetics 302 may comprise a common mode sense circuit 326 which may output a common mode signal 203. The common mode signal 203 may comprise the interference component $104'_n$ of the signal $103_n$. Utilizing the common mode signal 203 may mean that the signal 203 comprises (ideally) only the interference signal and thus it may be easier to lock onto the interference component. Utilizing the common mode signal 203 may require additional circuitry in the form of the common mode sense circuit and the common mode ADC 220. Additional details of the magnetics 202 are described below with respect to FIG. 3.

The processor 224 may comprise suitable logic, circuitry, interfaces, and/or code that may be operable to control operation of the Ethernet PHY 200. In this regard, the processor 224 may be operable to configure one or more components of the Ethernet PHY 100. For example, the processor 224 may configure coefficients of the equalizers $206_1$-$206_4$ and/or the adaptive filters $216_1$-$216_4$, provide control signals to the multiplexers $214_1$-$214_4$, and provide one or more control signals to the tone generator 218.

The memory 222 may comprise any suitable memory such as RAM, ROM, flash, and/or magnetic storage. The processor 224 may utilize the memory 222 to control operation of the Ethernet PHY 200.

Each of the ADCs $204_1$-$204_4$ and 220 may comprise suitable logic, circuitry, interfaces, and/or code that may be operable to convert an analog signal to a digital representation. In this regard, the analog signals $103_1$-$103_4$ coupled into the PHY 200 via the magnetics 202 may be converted to digital signals $205_1$-$205_4$. Similarly, the analog common mode signal 203 output by the magnetics 202 may be converted to the digital common mode signal 221.

Each of the equalizers $206_1$-$206_4$ may comprise suitable logic, circuitry, interfaces, and/or code may be operable to filter and/or otherwise process the digitized received signals $205_1$-$205_4$. The equalizers $206_1$-$206_4$ may, for example, filter the received signals to compensate for nonlinear, e.g., frequency dependent, distortion introduced by the physical channels $106_1$-$106_4$.

Each of the combiners $208_1$-$208_4$ may comprise suitable logic, circuitry, interfaces, and/or code that may be operable to add and/or subtract digital signals. A weighting may be applied to one or more of the signals prior to addition or subtraction of the signals.

Each of the slicers $210_1$-$210_4$ may comprise suitable logic, circuitry, interfaces, and/or code for implementing various aspects of the invention. Each of the slicers $210_1$-$210_4$ may be operable to determine a symbol value corresponding to a voltage of the corresponding one of the signals $209_1$-$209_4$. In an exemplary embodiment of the invention, each of the slicers $210_1$-$210_4$ may determine which double square 128 (DSQ128) symbol value is represented by the voltage of the corresponding one of the signals $209_1$-$209_4$. Also, each of the slicers $210_1$-$210_4$ may be operable to generate an error signal corresponding to the difference between the voltage of the corresponding one of the signals $209_1$-$209_4$ and the ideal voltage of the determined symbol.

The LDPC decoder 212 may comprise suitable logic, circuitry, interfaces, and/or code that may be operable to decode the received symbols output by the slicers $210_1$-$210_4$ to recover data originally transmitted by the source device. The decoding may correct for errors introduced while the data was in transmit.

Each of the error multiplexers $214_1$-$214_4$ may comprise suitable logic, circuitry, interfaces, and/or code that may be operable to select between a corresponding one of signals $209_1$-$209_4$ and a corresponding one of signals $213_1$-$213_4$.

The adaptive filters $216_1$-$216_4$ may comprise suitable logic, circuitry, interfaces, and/or code that may be operable to generate, respectively, signals $217_1$-$217_4$. The signals $217_1$-$217_4$ comprise estimations of the interference components $104'_1$-$104'_4$ present in the received signals $103_1$-$103_4$, respectively. A pair of quadrature-phase signals generated by the tone generator 218, and an output from a corresponding one of the error multiplexers $214_1$-$214_4$ may be input to each of the adaptive filters $216_1$-$216_4$.

The tone generator 218 may comprise suitable logic, circuitry, interfaces, and/or code that may be operable to lock to the interference component $104'_n$ of the signal $207_n$ and/or lock to the common mode signal 221

In operation, signals $103_1$-$103_4$ may be received via the channels $106_1$-$106_4$ and may be coupled into the Ethernet PHY 200 by the magnetics 202. The signals $103_1$-$103_4$ may comprise desired components $105_1$-$105_4$ and interference components $104'_1$-$104'_4$ resulting from the EMI 104 (FIG. 1). Additionally, in various embodiments of the invention, the magnetics 202 may output the common mode signal 203 which may correspond to the interference component $104'_n$ of the physical channel $106_n$, were n may be any value between 1 and 4, inclusive.

The signals $103_1$-$103_4$ may be digitized by the ADCs $204_1$-$204_4$ and processed by the equalizers $206_1$-$206_4$ to generate signals $207_1$-$207_4$. The signal 203 may be digitized by the ADC 220 to generate the signal 221. A data multiplexer of the tone generator 218 may select one of the input signals or a combination of input signals as described below in FIG. 2C. The tone generator 218 may then process the selected signal to isolate and/or enhance the interference $104'_n$ and generate the quadrature-phase signals $219_1$ and $219_2$.

The adaptive filters $216_1$-$216_4$ may, based on the output of a corresponding one of the error multiplexers $214_1$-$214_4$, utilize the phase-quadrature signals $219_1$ and $219_2$ to generate the estimate signals $217_1$-$217_4$. In this regard, an estimate signal $217_n$ may be generated for each physical channel $106_n$ to account for phase and/or amplitude variations among the interference components $104'_1$-$104'_4$. Such variations may result from, for example, variations in length and/or impedance among the channels $106_1$-$106_4$. To match the phase of the signal $217_n$ to the phase of the interference $104'_n$, the adaptive filter $216_n$ may scale one or both of the signals $219_1$ and $219_2$ and combine the scaled versions of the signals $219_1$-$219_2$, thus utilizing trigonometric identities to achieve the desired phase. To match the amplitude of the signal $217_n$ to the amplitude of the interference $104'_n$, the adaptive filter $217_n$ may scale one or both of the signals $219_1$ and $219_2$ and/or may scale the signal resulting from the combination of the signals $219_1$ and $219_2$. Operation of the error multiplexers $214_1$-$214_4$ is described below with respect to FIG. 2D.

The combiners $208_1$-$208_4$ may subtract the estimate signals $217_1$-$217_4$ from the signals $207_1$-$207_4$, respectively, to generate the signals $209_1$-$209_4$, which may comprise interference components $104''_1$-$104''_4$, respectively. Thus, in instances that the estimate signals $217_1$-$217_4$ are zero, then the interference components $104'_1$-$104'_4$ are equal to the interference components $104''_1$-$104''_4$. Conversely, in instances that the estimate signals $217_1$-$217_4$ exactly match the interference components $104'_1$-$104'_4$, then the interference components $104''_1$-$104''_4$ of the signals $209_1$-$209_4$ are zero.

The slicers $210_1$-$210_4$ may process the signals $209_1$-$209_4$ and, for each sample value, determine the symbol represented by the voltage. In an exemplary embodiment of the invention, the Ethernet PHY 200 may support 10GBASE-T and each slicer $210_n$ may determine which one of 16 possible symbols is represented by a voltage of the signal $209_n$. The slicer may output the determined symbol as signal $211_n$ and may output the difference between the ideal voltage of the determined symbol and the voltage of the signal $209_n$ as signal $213_n$.

The LDPC 212 may process the four received symbols from the slicers $210_1$-$210_4$ and determine the data originally transmitted by the source device. The LDPC 212 may provide forward error correction.

For convenience and clarity of description, signals upstream from the combiners $208_1$-$208_N$, including the signals $103_1$-$103_4$, the signals $205_1$-$205_4$, and the signals $207_1$-$207_4$, may be referred to as "received signals."

Figure 2B:
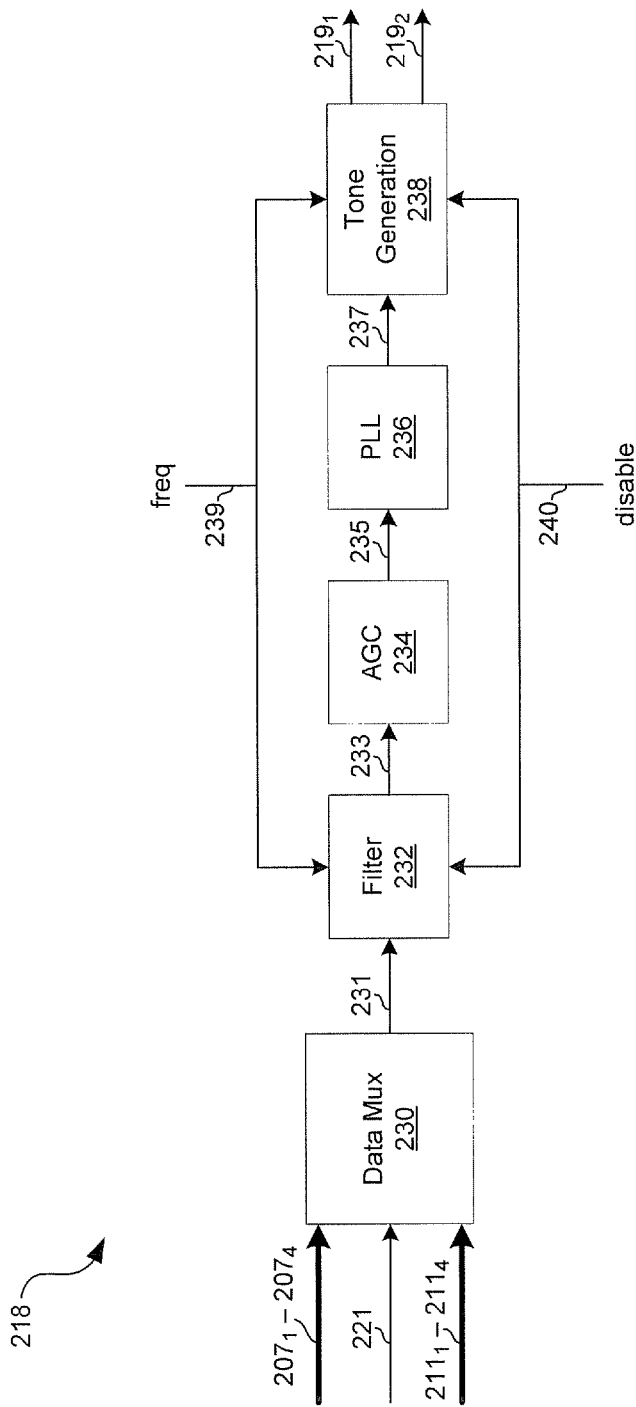
FIG. 2B is a diagram illustrating an exemplary tone generator operable to track an interference signal, in accordance with an embodiment of the invention.

FIG. 2B is a diagram illustrating an exemplary tone generator operable to track an interference signal, in accordance with an embodiment of the invention. Referring to FIG. 2B, the tone generator 218 may comprise a data multiplexer 230, a filter 232, automatic gain control (AGC) 234, phase locked loop (PLL) 236, and tone generation block 238.

The data multiplexer 230 may comprise suitable logic, circuitry, interfaces, and/or code which may be controlled to select one of a plurality of signals to be conveyed to the filter 232. An exemplary data multiplexer is described below with respect to FIG. 2C.

The filter 232 may comprise suitable logic, circuitry, interfaces, and/or code having a frequency response such that frequencies within a selected band are attenuated less than frequencies outside the selected band. In various embodiments of the invention, the filter 232 may be configurable such that it has a bandpass frequency response in one or more configurations and a high-pass frequency response in one or more other configurations. The frequency response of the filter 232, for example the center frequency for a bandpass response or the cut-off frequency for a high-pass response, may be controlled via the control signal 239 which may be generated by the processor 224. In an exemplary embodiment of the invention, the filter 232 may comprise a second order infinite impulse response (IIR) filter.

The AGC 234 may comprise suitable logic, circuitry, interfaces, and/or code that may be operable to apply a gain to the signal 233 to generate the signal 235. The amount of gain applied may be based on feedback such that levels of signal 235 are kept within an optimum range for operation of the PLL 236.

The PLL 236 may comprise suitable logic, circuitry, interfaces, and/or code that may be operable to generate a signal 237 having a frequency that tracks the frequency of the interference $104'_n$. In an exemplary embodiment of the invention, the PLL 236 may comprise a phase detector, a loop filter and one or more numerical controlled oscillators (NCOs) in a feedback path from the loop filter to the phase detector. The output of the loop filter may be the signal 237.

The tone generation block 238 may comprise suitable logic, circuitry, interfaces, and/or code that may be operable to generate phase-quadrature tones $219_1$ and $219_2$ having a frequency that tracks the frequency of the interference $104'_n$.

In operation, the data multiplexer 230 may select signal $207_n$, signal 221, or a signal corresponding to a difference between the signals $207_n$ and the signal $211_n$. The data multiplexer 230 may be controlled by the processor 224. In this regard, the processor 224 may control the data multiplexer 230 based on the presence and/or strength of one or more of the interference components $104''_1$-$104''_4$, which may be determined by, for example, monitoring the error outputs $213_1$-$213_4$ and/or an error rate out of the LDPC 212.

The signal selected by the data multiplexer 230 may be output as signal 231 to the filter 232. The filter 232 may process the signal 231 to generate the signal 233. Ideally, the signal 233 comprises only the interference $104'_n$, but in reality other signals and/or noise will also be present.

The frequency response of the filter 232 may be set by the processor 224. Furthermore, the processor 224 may disable one or more portions of the tone generator 218. In this regard, the tone generator 218 being disabled may result in the estimate signals $217_1$-$217_4$ (FIG. 2A) being zero and thus the signals $209_1$-$209_4$ (FIG. 2A) being equal to the signals $207_1$-$207_4$ (FIG. 2A). The processor 224 may enable and disable portions of the tone generator 218 based on the presence and/or strength of one or more of the interference components $104''_1$-$104''_4$, which may be determined by, for example, monitoring the error outputs $213_1$-$213_4$ and/or an error rate out of the LDPC 212.

The PLL 236 may lock to the signal 235 and output the signal 237. In this regard, because the filter 232 cannot perfectly pass only the interference $104'_n$, there may be other noise and/or components of the signal 233 that do not result from the interference 104. Accordingly, by locking to the frequency of the interference $104'n$ and generating the signal 237 from an oscillator that is more spectrally pure, the signals 237 may represent a cleaner version of the interference $104'_n$. That is, the signal 237 may be free of some noise or other signal components that are present in the signal 233.

The tone generation block 238 may receive the output of the PLL 238 and generate phase quadrature signals $219_1$ and $219_2$ having a frequency that accurately tracks the frequency of the interference $104'_n$.

Figure 2C:
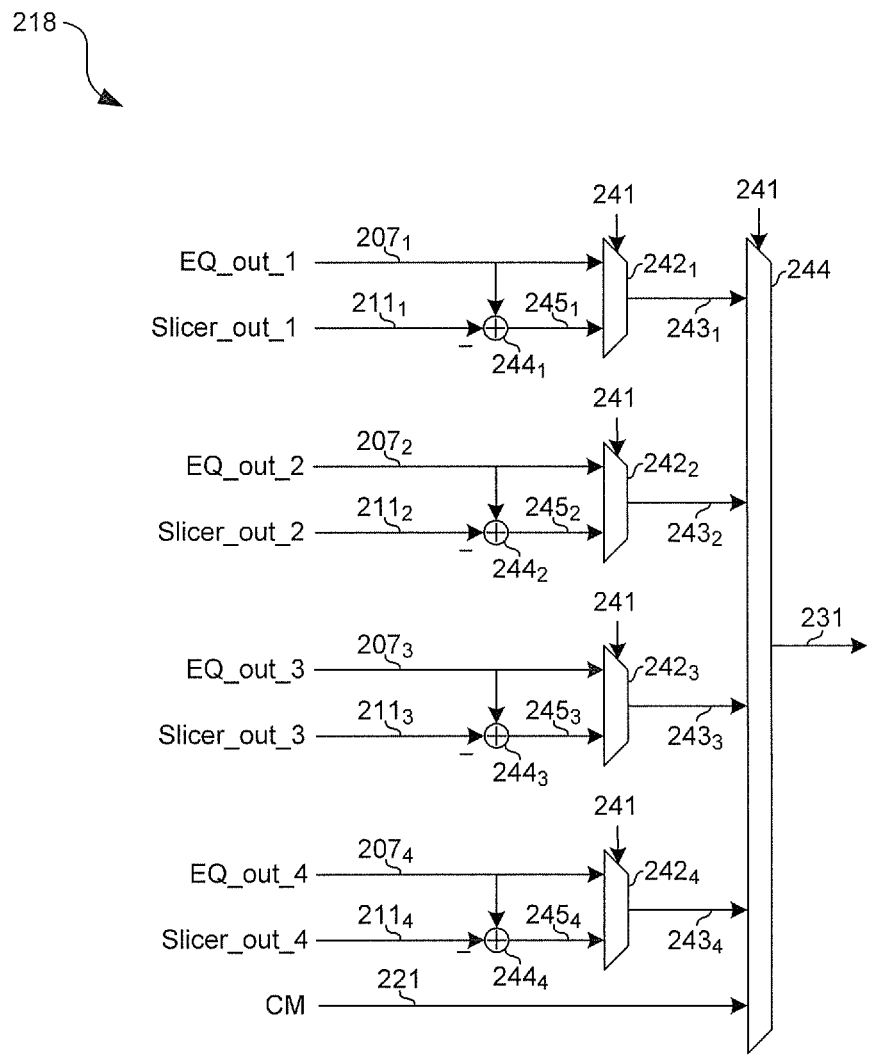
FIG. 2C is a diagram illustrating an exemplary data multiplexer in accordance with an embodiment of the invention.

FIG. 2C is a diagram illustrating an exemplary data multiplexer in accordance with an embodiment of the invention. Referring to FIG. 2C, the data multiplexer 230 may comprise combiners $244_1$-$244_4$, 2-to-1 multiplexers $242_1$-$242_4$, and a 5-to-1 multiplexer 241.

Each of the combiners $244_1$-$244_4$ may comprise suitable logic, circuitry, interfaces, and/or code that may be operable to add and/or subtract digital signals. A weighting may be applied to one or more of the signals prior to addition or subtraction of the signals. The combiners $244_1$-$244_4$ may subtract the estimate signals $207_1$-$207_4$ from the signals $211_1$-$211_4$, respectively, to generate the signals $245_1$-$245_4$.

Each 2-to-1 multiplexer $242_n$ may comprise suitable logic, circuitry, interfaces, and/or code that may be operable to select between the signal $211_n$ and the signal $245_n$ and output the selected signal as signal $243_n$.

The 5-to-1 multiplexer 241 may comprise suitable logic, circuitry, interfaces, and/or code that may be operable to select one of the signal $243_1$, $243_2$, $243_3$, $243_4$, and 221.

In operation, the processor 224 (FIG. 2A) may generate the signal 241 to control the multiplexers $242_1$-$242_4$ and 244. In an exemplary embodiment of the invention, the signal 221 may be selected if it is available. If the signal 221 is not available, one of the signals $207_1$-$207_4$ may be selected when the interference components $104''_1$-$104''_4$ are strong and one of the signals $245_1$-$245_4$ may be selected when the interference components $104''_1$-$104''_4$ are weak. In this regard, the data multiplexer 218 may be controlled based on the presence and/or strength of the interference 104, which may be determined by, for example, monitoring the error outputs $213_1$-$213_4$ and/or the error rate out of the LDPC decoder 212.

Figure 2D:
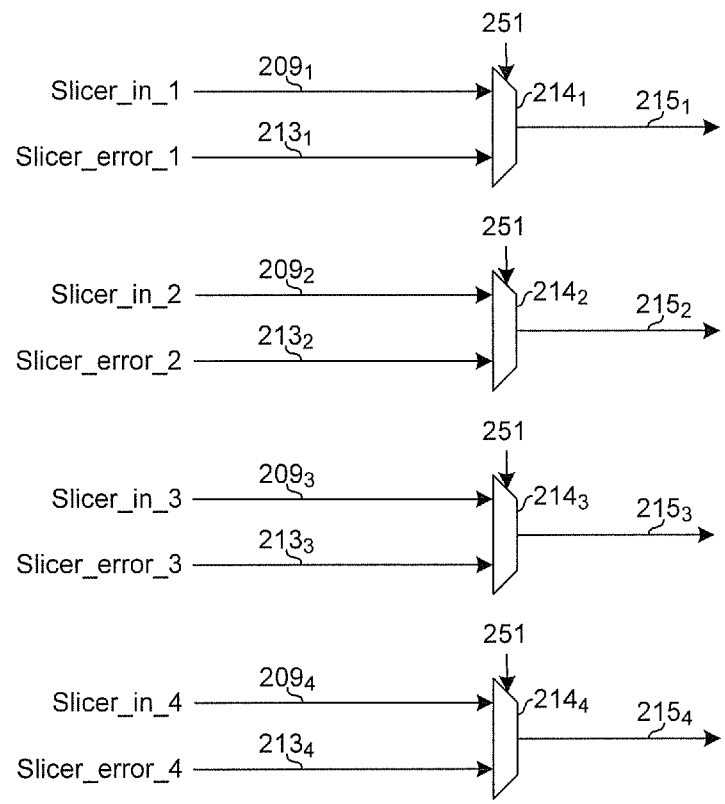
FIG. 2D is a diagram illustrating a plurality of error multiplexers in accordance with an embodiment of the invention.

FIG. 2D is a diagram illustrating a plurality of error multiplexers in accordance with an embodiment of the invention. Referring to FIG. 2D, each error multiplexer $214_n$ may comprise suitable logic, circuitry, interfaces, and/or code that may be operable to select between the signal $209_n$ and the signal $213_n$ and output the selected signal as signal $215_n$.

In operation, the processor 224 (FIG. 2A) may generate the signal 251 to control the error multiplexers $214_1$-$214_4$. Signal 251 may be generated based on the presence and/or strength of the interference components $104''_1$-$104''_4$, which may be determined by, for example, monitoring the error outputs $213_1$-$213_4$ and/or the error rate out of the LDPC decoder 212. In an exemplary embodiment of the invention, the signals $209_1$-$209_4$ may be selected when the interference components $104''_1$-$104''_4$ of the signals $209_1$-$209_4$ are strong and the signals $213_1$-$213_4$ may be selected when the interference components $104''_1$-$104''_4$ of the signals $209_1$-$209_4$ are weak. In this regard, the error multiplexers $214_1$-$214_4$ may initially be configured to select signals $209_1$-$209_4$ until the tone generator 218 has a chance to converge and start generating estimate signals $217_1$-$217_4$ that reduce the interference components $104''_1$-$104''_4$ of the signals $209_1$-$209_4$. Once the interference components $104''_1$-$104''_4$ have been sufficiently reduced, the error multiplexers $214_1$-$214_4$ may be reconfigured to select the signals $213_1$-$213_4$.

Figure 3:
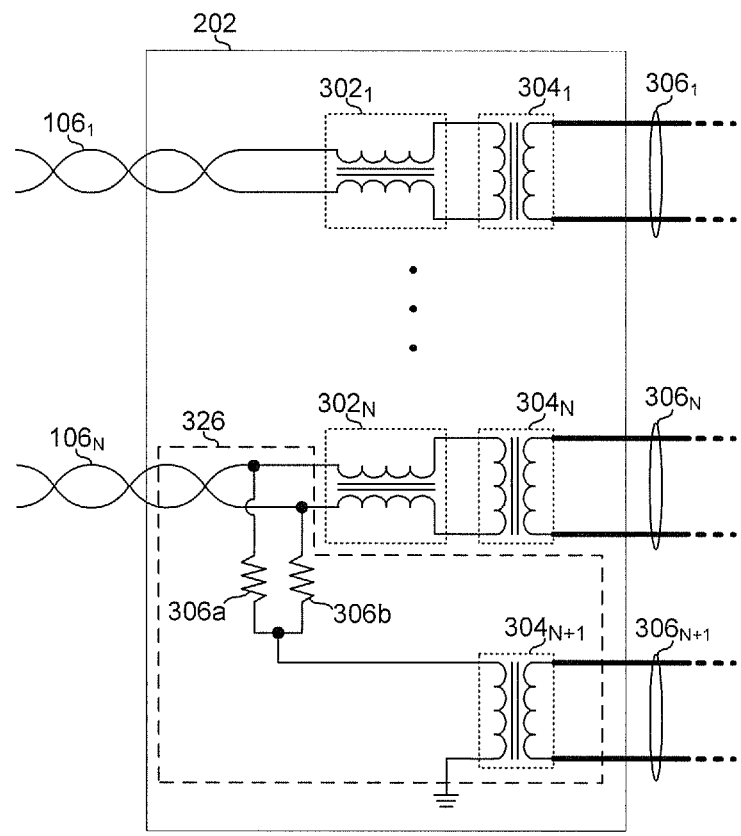
FIG. 3 is a diagram illustrating exemplary magnetics comprising a common mode sense circuit, in accordance with an embodiment of the invention.

FIG. 3 is a diagram illustrating exemplary magnetics comprising a common mode sense circuit, in accordance with an embodiment of the invention. Referring to FIG. 3, the magnetics 202 may couple the channels $106_1$-$106_N$ to the differential signal traces $306_1$-$306_N$. The magnetics 202 may comprise chokes $302_1$-$302_N$, transformers $304_1$-$304_{N+1}$, and resistors 306a and 306b. In this regard, the common mode sensor 326 may comprise the resistors 306a and 306b and the transformer $304_{N+1}$.

The chokes $302_1$-$302_N$ may be operable to attenuate common mode signals while passing differential signals. In an exemplary embodiment of the invention, the chokes $302_1$-$302_N$ may comprise one or more inductors and/or ferrites.

The transformers $304_1$-$304_{N+1}$ may be operable to inductively couple the differential outputs of the chokes $302_1$-$302_N$ to the differential signal traces $306_1$-$306_{N+1}$. Each of the transformers $304_1$-$304_{N+1}$ may comprise a primary winding, a secondary winding, and a core.

The resistors 306a and 306b and the transformer $304_{N+1}$ form an exemplary common mode sense circuit 326. In another exemplary embodiment of the invention, the common mode sensor 326 may comprise a center tap of one of the transformers $304_1$-$304_N$. In such an embodiment of the invention, the resistors 306a and 306b and the transformer $304_{N+1}$ may be unnecessary.

In operation, common mode energy on the two conductors of channel $106_N$ may sum through the resistors 306a and 306b and appear as a single-ended raw common mode signal at the primary winding $304_{N+1}$. The transformer $304_{N+1}$ may convert the single-ended raw common mode signal to a differential raw common mode signal on the differential trace $306_{N+1}$.

Figure 4:
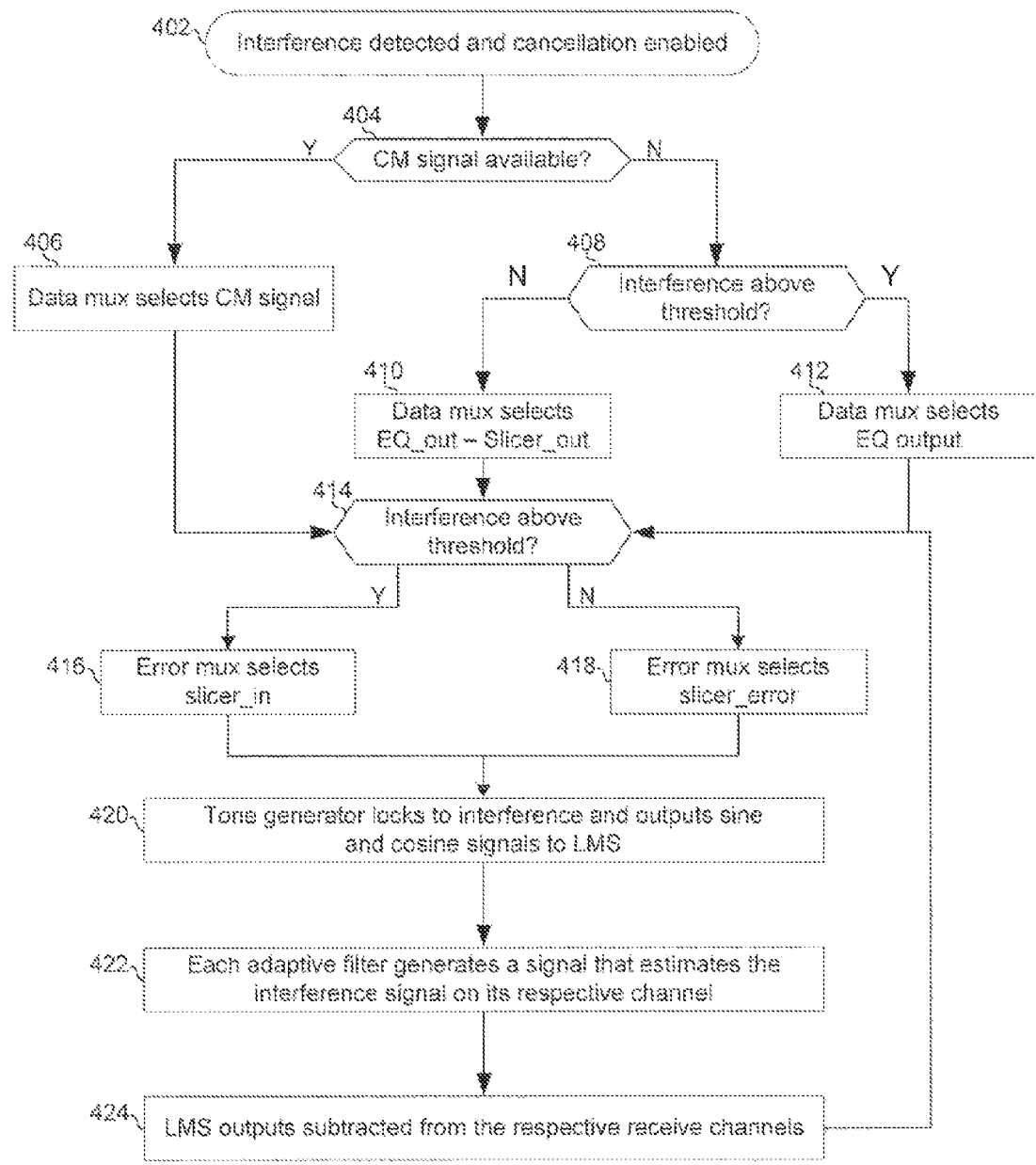
FIG. 4 is a flow chart illustrating exemplary steps for interference cancellation, in accordance with an embodiment of the invention.

FIG. 4 is a flow chart illustrating exemplary steps for interference cancellation, in accordance with an embodiment of the invention. Referring to FIG. 4, the exemplary steps may begin with step 402 in which the processor 224 may detect the presence of interference and enable interference cancellation. For example, the presence of interference may be detected based on an error rate out of the LDPC decoder 212. The cancellation of interference may comprise, for example, enabling various portions of the tone generator 218. In step 404, it may be determined whether the common mode signal 221 is available from the ADC 220. That is, it may be determined whether a common mode sense circuit 326 is present. In instances that there is no common mode sense circuit, the exemplary steps may advance to step 408. In step 408, it may be determined whether one or more of the interference components $104'_1$-$104'_N$ is above a threshold. In instances that the interference is above a threshold, the steps may advance to step 412. In step 412, the data multiplexer 230 may be configured to select the signal $207_n$ to be output as signal 231. Subsequent to step 412, the exemplary steps may advance to step 414.

Returning to step 408, in instances that the interference components $104'_1$-$104'_N$ are below a threshold, the exemplary steps may advance to step 410. In step 410, the data multiplexer may be configured to select the difference between an equalizer output $207_n$ and the corresponding slicer decision output $211_n$. Subsequent to step 410, the exemplary steps may advance to step 414.

Returning to step 404, in instances that the signal 221 is available, the exemplary steps may advance to step 406. In step 406, the data multiplexer 230 may be configured to select the signal 221 to be output as the signal 231.

In step 414, it may be determined whether the interference present in one or more of the signals $209_1$-$209_N$ is above a threshold. Subsequent to step 406, the exemplary steps may advance to step 414.

In step 414, it may be determined whether one or more of the interference components $104''_1$-$104''_N$ are above a threshold. In instances that the interference is above a threshold, the exemplary steps may advance to step 416. In step 416, the error multiplexers $214_1$-$214_N$ may be configured to select the signals $209_1$-$209_N$, respectively. Subsequent to step 416 the exemplary steps may advance to step 420.

Returning to step 414, in instances that the interference components $104''_1$-$104''_N$ are below a threshold, the exemplary steps may advance to step 418. In step 418, the error multiplexers $214_1$-$214_N$ may be configured to select the signals $213_1$-$213_N$, respectively. Subsequent to step 418 the exemplary steps may advance to step 420.

In step 420, the tone generator 218 may lock to the interference and output phase-quadrature tones $219_1$ and $219_2$. In step 422, the adaptive filters $216_1$-$216_N$ may utilize the signals $219_1$ and $219_2$ and the output of the error multiplexers $214_1$-$214_N$ to generate the estimate signals $217_1$-$217_N$. In step 424, the estimate signals $217_1$-$217_N$ may be subtracted from the signals $207_1$-$207_N$, in order to reduce the interference components $104''_1$-$104''_N$. Subsequent to step 424, the exemplary steps may return to step 414.

Various embodiments of a method and system for adaptive tone cancellation for mitigating the effects of electromagnetic interference are provided. In an exemplary embodiment of the invention, an Ethernet PHY 200 may receive one or more signals $103_1$-$103_N$ via a corresponding one or more physical channels $106_1$-$106_N$. The Ethernet PHY 200 may generate one or more estimate signals $217_1$-$217_N$, each of which approximates interference $104'_1$-$104'_N$ present in a corresponding one of the received signals $103_1$-$103_N$. The Ethernet PHY 200 may be operable to subtract each one of the estimate signals $217_1$-$217_N$ from a corresponding one of received signals $207_1$-$207_N$, where received signals $207_1$-$207_N$ may correspond to the received signals $103_1$-$103_4$ at the output of equalizers $106_1$-$106_4$. The subtracting may occur at the input of one or more slicers 210 in the Ethernet PHY 200. A signal $207_n$ output by an equalizer $206_n$ may be utilized to generate the one or more estimate signals $217_1$-$217_N$. The Ethernet PHY 200 may receive a common mode signal 203 from a common mode sensor 326 coupled to one of the physical channels $106_1$-$106_N$. The common mode signal 203 may be utilized to generate the one or more estimate signals $217_1$-$217_N$. A decision output $211_n$ of a slicer $210_n$ in the Ethernet PHY 200 may be subtracted from an output $207_n$ of an equalizer $206_n$ in the Ethernet PHY 200. A signal $245_n$ resulting from the subtraction may be utilized to generate the one or more estimate signals $217_1$-$217_N$.

The one or more estimate signals $217_1$-$217_N$ may be generated utilizing a selected one of the following signals: (1) an equalizer output $207_n$; (2) a signal $245_n$ resulting from a subtraction of a slicer decision output $211_n$ from the equalizer output $207_n$; and (3) a signal 221 output by a common mode sense circuit 326 coupled to one of the physical channels $106_1$-$106_N$. The selection may be based on a strength of the interference $104'_1$-$104'_N$ that may be present in the signals $207_1$-$207_N$. The Ethernet PHY 200 may be operable to generate a pair of phase-quadrature signals $219_1$ and $219_2$ having a frequency that tracks a frequency of the interference $104'_1$-$104'_N$. An adaptive filter $216_n$ in the Ethernet PHY 200 may utilize the phase-quadrature signals $219_1$ and $219_2$ to generate the one or more estimate signals $217_1$ and $217_2$. The estimate signal $217_n$ may be generated utilizing a selected one of a decision output $211_n$ of a slicer $210_n$ and an error output $213_n$ of the slicer $210_n$. The selected one of the decision output $211_n$ and the error output $213_n$ may be utilized by the adaptive filter $216_n$ to generate the estimate signal $217_n$. The selection may be based on strength of the interference $104''_n$ present in the signal $209_n$.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for adaptive tone cancellation for mitigating the effects of electromagnetic interference.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
   receiving, by an Ethernet PHY, a signal from a physical channel;
   processing the received signal at an equalizer to compensate for distortion introduced by the physical channel, thereby generating an equalizer output signal;
   receiving, by the Ethernet PHY, a common mode signal from the physical channel;
   determining a signal for generating an estimate signal that approximates interference present in the received signal from a selected signal chosen from (1) the common mode signal, (2) the equalizer output signal, and (3) a resulting signal that is a difference between the equalizer output signal and a decision output signal of a slicer circuit component,
   wherein the common mode signal is chosen when present; the equalizer output signal is alternatively chosen when the strength of the interference meets or is above a designated threshold value and the common mode signal is not present; and the resulting signal is alternatively chosen when the strength of the interference is below a designated threshold value and the common mode signal is not present;
   processing the selected signal to isolate the interference and generate a quadrature-phase signal;
   utilizing the phase-quadrature signal to generate the estimate signal that approximates interference present in the received signal; and
   subtracting the estimate signal from the equalizer output signal, thereby generating a corrected equalizer output signal, wherein the corrected equalizer output signal is tapped to an input of a slicer circuit component in the Ethernet PHY.

2. The method of claim 1, further comprising processing the corrected equalizer output signal to determine a symbol value and outputting the determined symbol value.

3. The method of claim 2, further comprising determining the strength of the interference being approximated by monitoring an error rate of the slicer circuit component corresponding to a difference between an ideal voltage of the symbol value and a voltage of the corrected equalizer output signal being input to the slicer circuit component.

4. The method of claim 2, further comprising decoding, by decoder circuitry, the symbol value outputted by the slicer circuit component.

5. The method of claim 4, further comprising determining the strength of the interference being approximated by monitoring an error rate of the decoder circuitry.

6. The method of claim 1, further comprising:
   choosing one of the corrected equalizer output signal or an error output of the slicer circuit component that corresponds to a difference between the remaining signal and the decision output of the slicer circuit component; and
   utilizing the chosen signal with the phase-quadrature signal to generate the estimate signal.

7. The method of claim 1, wherein the phase-quadrature signal is locked to an interference component of the selected signal.

8. A system comprising:
   an input port of an Ethernet PHY configured to receive a signal from a physical channel;
   equalizer circuitry configured to process the received signal to compensate for distortion introduced by the physical channel, thereby generating an equalizer output signal;
   common mode sensor circuitry coupled to the physical channel and configured to receive a common mode signal from the physical channel;
   tone generator circuitry coupled to outputs of the equalizer circuitry and the common mode sensor circuitry,
   wherein the tone generator circuitry is configured to determine a signal for generating an estimate signal that approximates interference present in the received signal from a selected signal chosen from (1) the common mode signal, (2) the equalizer output signal, and (3) a resulting signal that is a difference between the equalizer output signal and a decision output signal of a slicer circuit component,
   wherein the common mode signal is chosen when present; the equalizer output signal is alternatively chosen when the strength of the interference meets or is above a designated threshold value and the common mode signal is not present; and the resulting signal is alternatively chosen when the strength of the interference is below a designated threshold value and the common mode signal is not present;
   the tone generator circuitry further configured to process the selected signal to isolate the interference and generate a quadrature-phase signal;
   adaptive filter circuitry coupled to an output of the tone generator circuitry, wherein the adaptive filter circuitry is configured to generate the estimate signal that approximates interference present in the received signal utilizing the phase-quadrature signal; and
   combiner circuitry configured to subtract the estimate signal from the equalizer output signal, thereby generating a corrected equalizer output signal, wherein the corrected equalizer output signal is tapped to an input of a slicer circuit component in the Ethernet PHY.

9. The system of claim 8, further comprising the slicer circuit component, wherein the slicer circuit component is configured to process the corrected equalizer output signal to determine a symbol value and output the determined symbol value.

10. The system of claim 9, wherein the tone generator circuitry is further configured to determine the strength of the interference being approximated by monitoring an error rate of the slicer circuit component corresponding to a difference between an ideal voltage of the symbol value and a voltage of the corrected equalizer output signal being input to the slicer circuit component.

11. The system of claim 9, further comprising decoder circuitry configured to decode the symbol value outputted by the slicer circuit component.

12. The system of claim 11, wherein the tone generator circuitry is further configured to determine the strength of the interference being approximated by monitoring an error rate of the decoder circuitry.

13. The system of claim 8, further comprising an error multiplexer component configured to choose one of the corrected equalizer output signal or an error output of the slicer circuit component that corresponds to a difference between the remaining signal and the decision output of the slicer circuit component,
   wherein the chosen signal with the phase-quadrature signal is utilized to generate the estimate signal by the adaptive filter circuitry.

14. The system of claim 8, wherein the tone generator circuitry locks a frequency of the phase-quadrature signal to a frequency of the selected signal.

15. The system of claim 8, further comprising an analog-to-digital converter component coupled between the input port of the physical channel and an input of the equalizer circuitry.

16. The system of claim 8, further comprising an analog-to-digital converter component coupled between the input port of the physical channel and an input of the common mode sensor circuitry.

17. A communication device, comprising:
an Ethernet physical layer coupled to a physical channel;
a processor configured to control operation of the Ethernet physical layer, and
a common mode sense circuit coupled to the physical channel and configured to output a common mode signal,
wherein the processor and the Ethernet physical layer are configured to:
receive a signal from the physical channel;
process the received signal to compensate for distortion introduced by the physical channel, thereby generating an equalizer output signal;
process the equalizer output signal to determine a symbol value and output the determined symbol value as a decision output signal;
receive the common mode signal from the common mode sense circuit;
determine a signal for generating an estimate signal that approximates interference present in the received signal based on a selected signal chosen from one of (1) the common mode signal; (2) the equalizer output signal; and (3) the decision output signal; and
utilize the selected signal to generate the estimate signal that approximates the interference present in the received signal; and
subtract the estimate signal from the equalizer output signal, thereby generating a corrected equalizer output signal,
wherein the corrected equalizer output signal is tapped to an input of a slicer circuit component in the Ethernet physical layer that outputs the decision output signal.

18. The communication device of claim 17, wherein said one of the common mode signal; the equalizer output signal; or the decision output signal is selected based on a strength of the interference in the selected signal.

19. The communication device of claim 17, wherein the physical layer and the processor are further configured to generate a phase-quadrature signal for the generation of the estimate signal.

20. The communication device of claim 17, wherein the physical layer and the processor are further configured to determine the signal for generating the estimate signal that approximates interference present in the received signal by selecting the common mode signal when present; alternatively selecting the equalizer output signal when the strength of the interference meets or is above a designated threshold value and the common mode signal is not present; or alternatively selecting the decision output signal when the strength of the interference is below a designated threshold value and the common mode signal is not present.

* * * * *